Patented Oct. 7, 1924.

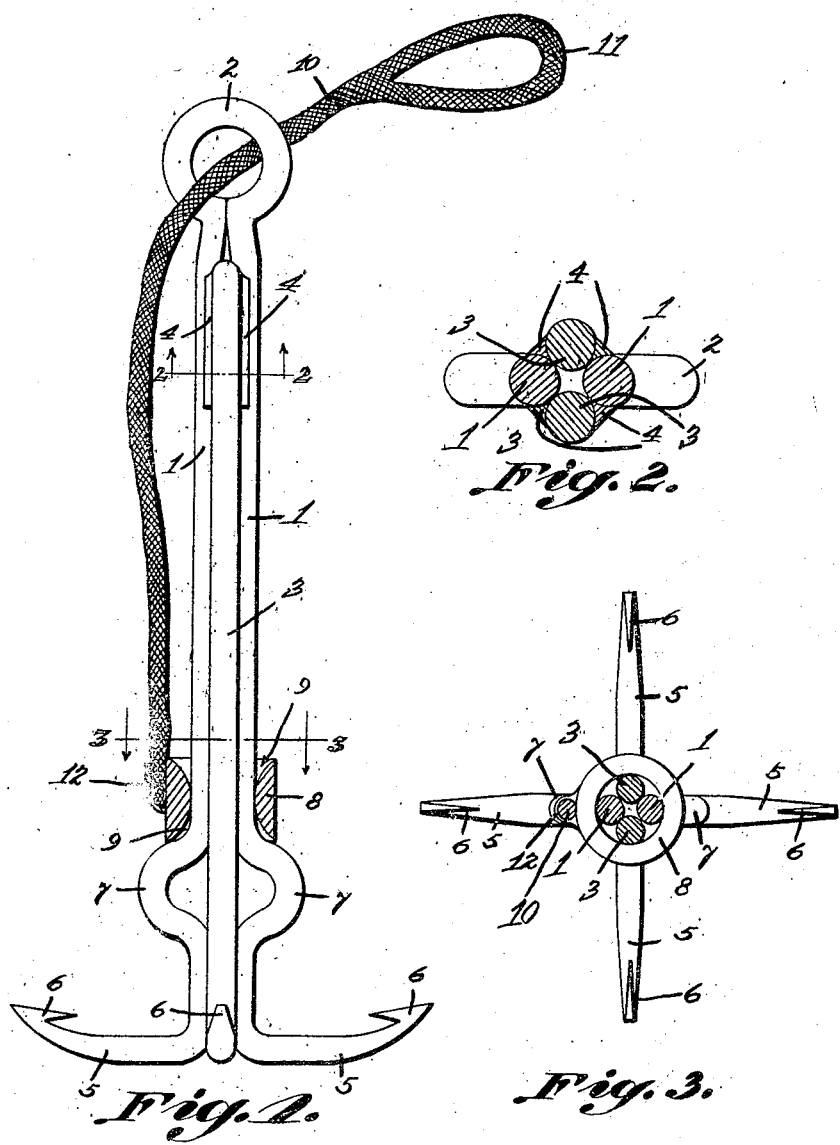

1,510,774

UNITED STATES PATENT OFFICE.

GEORGE FREDERIC GAUTHIER, OF BIG LAKE, WASHINGTON.

HOOK.

Application filed December 4, 1922. Serial No. 604,874.

*To all whom it may concern:*

Be it known that I, GEORGE F. GAUTHIER, a citizen of the United States, residing at Big Lake, in the county of Skagit and State of Washington, have invented a new and useful Hook, of which the following is a specification.

The device forming the subject matter of this application is a fish hook, and the invention aims so to construct the hook that when the same is drawn downwardly by the fish, spring arms will be set free, the spring arms moving outwardly to hold the fish, and a sure catch resulting.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention, the rider appearing in section; Figure 2 is a cross section on the line 2—2 of Figure 1; Figure 3 is a cross section on the line 3—3 of Figure 1.

The hook forming the subject matter of this application embodies main spring arms 1 connected at their upper ends by an annular guide 2, and auxiliary spring arms 3 connected at their upper ends, as shown at 4, to the main spring arms 1, to form, at the upper end of the device, a rigid shank which carries the guide 2. Although four arms 1—3 are shown in the drawings, it is to be understood that there may be as many or as few of the arms as is considered expedient: preferably, however, there are not less than three of the arms. The lower portions of the arms 1 and 3 are resilient, and tend to swing outwardly. At their lower extremities the arms 1 and 3 are supplied with outstanding fingers 5 carrying barbs 6. The parts 5 and 6 constitute hooks at the lower ends of the arms 1 and 3, and it may be stated that these hooks may be constructed as desired, although, preferably, they are of the form shown, the fingers 5 being disposed approximately at right angles to the arms 1 and 3. The arms 1, adjacent to their lower ends, are bulged outwardly to form stops 7 limiting the downward movement of a tubular rider 8 which is mounted for reciprocation on the arms 1 and 3, the bore of the rider preferably being flared at its ends, as shown at 9, so that the rider may not have too strong a frictional hold on the arms. A connecting element 10 is provided, and, preferably is flexible, the connecting element being made of braided wire, if desired. The connecting element 10 passes slidably through the guide 2 and is supplied at its upper end with any suitable means for connecting it with a fishing line (not shown) : a loop 11 in the connecting element will answer the purpose. The lower end of the connecting element 10 is secured at 12 to the rider 8.

In practical operation, the rider 8 is thrust downwardly until it abuts against the stops 7, thereby holding the arms 1 and 3 under compression, as shown in Figure 1. When, however, a fish exerts a pull upon the hooks 5—6, the body portion of the device will slide downwardly, the guide 2 moving along the connecting element 10, and drawing the rider 8 upwardly, whereupon the arms 1 and 3 will expand, thereby insuring an impaling of the fish on the hooks 5—6.

What is claimed is:—

A fish hook comprising outwardly expansible arms connected at their extreme upper ends by an integral upstanding eye, the arms being bowed outwardly at points adjacent to their lower ends to form stops, a third outwardly expansible arm, means for securing the upper end of the third arm to the first specified arms at a point near to the eye, to form a rigid shank, a rider slidable upon the arms and of such diameter as to bring all portions of the arms which lie above and below the stops into contact, when the rider engages the stops, thereby to stiffen the device, fingers at the lower ends of the arms, the stops being so constructed as to limit the downward movement of the rider absolutely and positively and to hold the rider absolutely against engagement with the fingers, and an operating member connected to the rider and slidable in the eye.

In testimony that I claim the foregoing as my own, I have hereto affixed my signature in the presence of two witnesses.

GEORGE FREDERIC GAUTHIER.

Witnesses:
C. W. GRANT,
JACK RAYNO.